(12) United States Patent
Kajihara

(10) Patent No.: US 8,964,760 B2
(45) Date of Patent: Feb. 24, 2015

(54) INTERPROCESSOR COMMUNICATION SYSTEM AND COMMUNICATION METHOD, NETWORK SWITCH, AND PARALLEL CALCULATION SYSTEM

(75) Inventor: Nobuki Kajihara, Tokyo (JP)

(73) Assignee: NEC Corporation, Tokyo (JP)

( * ) Notice: Subject to any disclaimer, the term of this patent is extended or adjusted under 35 U.S.C. 154(b) by 357 days.

(21) Appl. No.: 13/255,466

(22) PCT Filed: Mar. 8, 2010

(86) PCT No.: PCT/JP2010/053785
§ 371 (c)(1),
(2), (4) Date: Sep. 8, 2011

(87) PCT Pub. No.: WO2010/104033
PCT Pub. Date: Sep. 16, 2010

(65) Prior Publication Data
US 2011/0317691 A1    Dec. 29, 2011

(30) Foreign Application Priority Data

Mar. 9, 2009    (JP) ................................. 2009-055030

(51) Int. Cl.
*H04L 12/28* (2006.01)
*H04L 12/933* (2013.01)
*H04L 12/50* (2006.01)

(52) U.S. Cl.
CPC ............ *H04L 49/101* (2013.01); *H04L 49/109* (2013.01)
USPC .......................... 370/395.4; 370/360; 370/413

(58) Field of Classification Search
None
See application file for complete search history.

(56) References Cited

U.S. PATENT DOCUMENTS 6,252,792 B1     6/2001 Marshall et al.
6,430,180 B1 *   8/2002 Bohm et al. ................. 370/369

(Continued)

FOREIGN PATENT DOCUMENTS

JP    06-205478 A    7/1994
JP    11-239159 A    8/1999

(Continued)

OTHER PUBLICATIONS

Hiroki Matsutani, et al., "Adding Slow-Silent Virtual Channels for Low-Power On-Chip Networks", Proceedings of the International Symposium on Networks-on-Chip (NOCS' 08), 2008, pp. 23-32.

(Continued)

*Primary Examiner* — Ayaz Sheikh
*Assistant Examiner* — Sori Aga
(74) *Attorney, Agent, or Firm* — Sughrue Mion, PLLC

(57) ABSTRACT

A network switch transfers data, which are to be transferred between nodes, in a time-division multiplex manner after allocating the data to slots, which are created by dividing a unit of time into a plurality of sections. An input unit includes a selection unit that selects a buffer unit according to an input slot in order to transfer the data input from the input port to the buffer unit, an input slot correspondence management table that stores a correspondence relationship between the input slots and the buffer units, and input port management information used to control a communication bandwidth of the input port. An output unit includes a multiplexing unit that selects the buffer unit according to an output slot in order for data, which is to be output to the output port, to be transferred from the selected buffer unit to the output port, an output slot correspondence management table that stores a correspondence relationship between the output slots and the buffer units, and output port manage information used to control a communication bandwidth of the output port.

9 Claims, 14 Drawing Sheets

(56) References Cited

U.S. PATENT DOCUMENTS

| | | | |
|---|---|---|---|
| 7,082,132 B1 * | 7/2006 | Beshai et al. | 370/391 |
| 2003/0035371 A1 * | 2/2003 | Reed et al. | 370/230 |
| 2004/0174187 A1 | 9/2004 | New | |

FOREIGN PATENT DOCUMENTS

| | | |
|---|---|---|
| JP | 2000-196609 A | 7/2000 |
| JP | 2001-320375 A | 11/2001 |
| JP | 2005-123770 A | 5/2005 |
| JP | 2006-522563 A | 9/2006 |
| JP | 2007-500985 A | 1/2007 |
| JP | 2007-074234 A | 3/2007 |
| JP | 2007-074740 A | 3/2007 |
| JP | 2007-329936 A | 12/2007 |
| WO | 2006/040903 A1 | 4/2006 |

OTHER PUBLICATIONS

Jeroen A. J. Leijten, et al., "Stream Communication between Real-time Tasks in a High-Performance Multiprocessor", Design, Automation and Test in Europe, 1998, pp. 125-132.

* cited by examiner

132 INPUT SLOT CORRESPONDENCE MANAGEMENT TABLE

US 8,964,760 B2

INTERPROCESSOR COMMUNICATION SYSTEM AND COMMUNICATION METHOD, NETWORK SWITCH, AND PARALLEL CALCULATION SYSTEM

CROSS REFERENCE TO RELATED APPLICATIONS

This application is a National Stage of International Application No. PCT/JP2010/053785 filed Mar. 8, 2010, claiming priority based on Japanese Patent Application No. 2009-055030 filed Mar. 9, 2009, the contents of all of which are incorporated herein by reference in their entirety.

TECHNICAL FIELD

The present invention relates to an interprocessor communication system and communication method of an inter-function-node communication type in a parallel processing (parallel calculation) system consisting of a plurality of processing (function) nodes, a network switch, and a parallel calculation system, and particularly to a communication system and communication method for guaranteeing a communication bandwidth between function nodes.

BACKGROUND ART

As a system LSI has become sophisticated and larger in size, many function nodes (processing constituents that require functions such as calculation, storage, or IO (Input/Output)) have been installed in the LSI. A plurality of function nodes described above can be regarded as a parallel calculation system in which the function nodes work together to perform one process. It is necessary to transfer data between a plurality of function nodes. When the number of function nodes is small, communication generally takes place in such a way that one communication path called bus is shared in a time division manner when data are transferred between function nodes. As the number of function nodes increases, the bus turns out to be a bottleneck in terms of performance when large amounts of data are simultaneously transferred. Therefore, in recent years, for a system LSI in which many function nodes are installed, the idea of using a network for communication between function nodes has been studied. A method of connecting function nodes in a system LSI using a network is known as NoC (Network On Chip).

FIG. 2 shows an example of the configuration of a parallel calculation system 1000 having a two-dimensional mesh structure. The parallel calculation system 1000 includes a plurality of function nodes 200 and a plurality of network switches 100, which connect the function nodes 200. The communication between the function nodes 200 is performed via the network switches 100.

What is disclosed in NPL 1 is a typical network switch (on-chip router) for on-chip network (FIG. 13). A conventional network switch decides on a route dynamically based on a destination node address stored in a packet header. Therefore, the transferring process may need to wait for an undetermined period of time depending on how crowded the to-be-transferred packets are. Depending on a routing algorithm, a deadlock could occur. However, the adoption of a virtual channel helps prevent a deadlock. It is also possible to mitigate the congestion of packets.

FIG. 13 shows an example of a network switch 100 having two virtual channels. The network switch 100 includes five input ports 110, five output ports 120, a 5×5 crossbar switch, an arbiter unit, and five FIFO (First-In First-Out) buffers. In this case, a process of transferring data from each input port 110 to each output port 120 is performed via the crossbar switch. However, even in this case, the transfer time is undetermined; it is difficult to guarantee a communication bandwidth in communication between function nodes when packets are transferred. In this case, in order to guarantee the communication bandwidth between nodes, the following and other steps have been taken: the network switch 100 is so designed that the performance of the network switch 100 is higher than required relative to a requested communication bandwidth.

FIG. 14 shows a time-division multiplex switch, which is disclosed in PTL 1 and NPL 2. A network switch 100, which makes up the time-division multiplex switch, includes five input ports 110, five output ports 120, a 5×5 crossbar switch, a slot table 700, and five FIFO buffers. In this case, a process of transferring data from the input ports 110 to the output ports 120 is performed via the crossbar switch. In the time-division multiplex switch shown in FIG. 14, a unit of time, called frame, is divided into slots, which are much smaller in time, before the crossbar switch is controlled. The crossbar switch is controlled based on connection information, which is stored in advance in the slot table 700. A slot is allocated according to a data transfer communication bandwidth needed for a process of transferring data from a given input port 110 to an output port 120. Therefore, it is possible to carry out communication with a guaranteed communication bandwidth.

CITATION LIST

Patent Literature

{PTL 1} Jpn PCT National Publication No. 2007-500985 (Columns 18 to 21, FIG. 1)

Non-Patent Literature

{NPL 1} Matsutani H, Koibuchi M, Wang D, Amano H. 2008. Adding Slow-Silent Virtual Channels for Low-Power On-Chip Networks. Proceedings of the International Symposium on Networks-on-Chip (NOCS' 08): pp. 23 to 32.

{NPL 2} Leijten, J. A. J.; van Meerbergen, J. L.; Timmer, A. H.; Jess, J. A. G. 23 to 26 February. Feb. 23 to 26, 1998, Stream communication between real-time tasks in a high-performance multiprocessor, Design, Automation and Test in Europe, 1998, Proceedings, pp. 125 to 131 (FIGS. 5 and 7)

SUMMARY OF THE INVENTION

Technical Problem

However, there is the following problem with the time-division multiplex switch disclosed in the above PTL 1.

That is, in the time-division multiplex switch, if the communication bandwidths requested by each input/output port are not uniform depending on the state of communication, power is consumed wastefully. The reason the above problem arises is that even though the communication bandwidths requested by each input port and each output port are generally different, all the input/output ports run in the same communication bandwidth as that of the input/output ports requiring the largest communication bandwidth among all the input/output ports.

An exemplary object of the present invention is to provide a low-power inter-function-node communication system and communication method that guarantee a communication bandwidth between a plurality of function nodes.

Solution to Problem

An interprocessor communication system according to an exemplary aspect of the invention includes a plurality of network switches.

The network switches include: a plurality of input units that input data which are to be transferred between nodes; a plurality of output units that output the data; a plurality of buffer units that act as intermediaries for data being transferred between a plurality of the input units and a plurality of the output units; an input port control unit setting unit that sets control information used to control a plurality of the input units; and an output port control unit setting unit that sets control information used to control a plurality of the output units, wherein data that are to be transferred between the nodes via a plurality of the input units, a plurality of the output units and a plurality of the buffer units are allocated to slots, which are created by dividing a unit of time into a plurality of sections, before being transferred in a time-division multiplex manner.

The input units include an input port into which the data transferred by the slot is input, and an input port control unit, the input port control unit includes a selection unit that selects the buffer unit according to an input slot into which the data is input in order to transfer the data input from the input port to the buffer unit, an input slot correspondence management table that stores a correspondence relationship between the input slots and the buffer units in order to allow the selection unit to select the buffer according to the input slot, and input port management information used to control a communication bandwidth of the input port.

The output units include an output port from which the data transferred by the slot is output, and an output port control unit, and the output port control unit includes a multiplexing unit that selects the buffer unit according to an output slot from which the data is output in order for the data, which is to be output to the output port, to be transferred from the selected buffer unit to the output port, an output slot correspondence management table that stores a correspondence relationship between the output slots and the buffer units in order to allow the multiplexing unit to select the buffer unit according to the output slot, and output port manage information used to control a communication bandwidth of the output port.

An interprocessor communication method according to an exemplary aspect of the invention uses a plurality of network switches.

The network switches transfer data, which are to be transferred between nodes via a plurality of input units, a plurality of buffer units and a plurality of output units, in a time-division multiplex manner after allocating the data to slots, which are created by dividing a unit of time into a plurality of sections.

A plurality of the input units store, in an input slot correspondence management table, a correspondence relationship between the input slots and the buffer units in order to select the buffer unit according to the input slot into which the data is input, control a communication bandwidth of the input port with the use of input port management information, input the data, which is transferred by the slot, from the input port, and select the buffer unit according to the input slot into which the data is input on the basis of the input slot correspondence management table in order to transfer the data, which is input from the input port, to the buffer unit.

A plurality of the output units store, in an output slot correspondence management table, a correspondence relationship between the output slots and the buffer units in order to select the buffer unit according to the output slot from which the data is output, control a communication bandwidth of the output port with the use of output port management information, select the buffer unit according to the output slot from which the data is output on the basis of the output slot correspondence management table in order to transfer the data, which is output to the output port, from the selected buffer unit to the output port, and output the data, which is transferred by the slot, from the output port.

Advantageous Effects of Invention

According to the present invention, the data transferred between the nodes are allocated to the slots, which are created by dividing a unit of time into a plurality of sections; the data are transferred in a time-division multiplex manner. A process of transferring data to the input ports and output ports of the network switch is performed based on the information that is set in advance as the input slot correspondence management table and output slot correspondence management table. Therefore it is definitely possible to transfer data between the input ports and the output ports during a predetermined period of time. It is possible to guarantee communication bandwidths when communication takes place.

Moreover, each input port and output port of the network switch are able to set communication bandwidths separately using the input port management information and the output port management information, respectively. Since a minimum communication bandwidth is set for a requested communication bandwidth, low-power communication is possible.

DESCRIPTION OF EMBODIMENTS

The following describes in detail an exemplary embodiment of the present invention with reference to the accompanying drawings.

Figure 1:
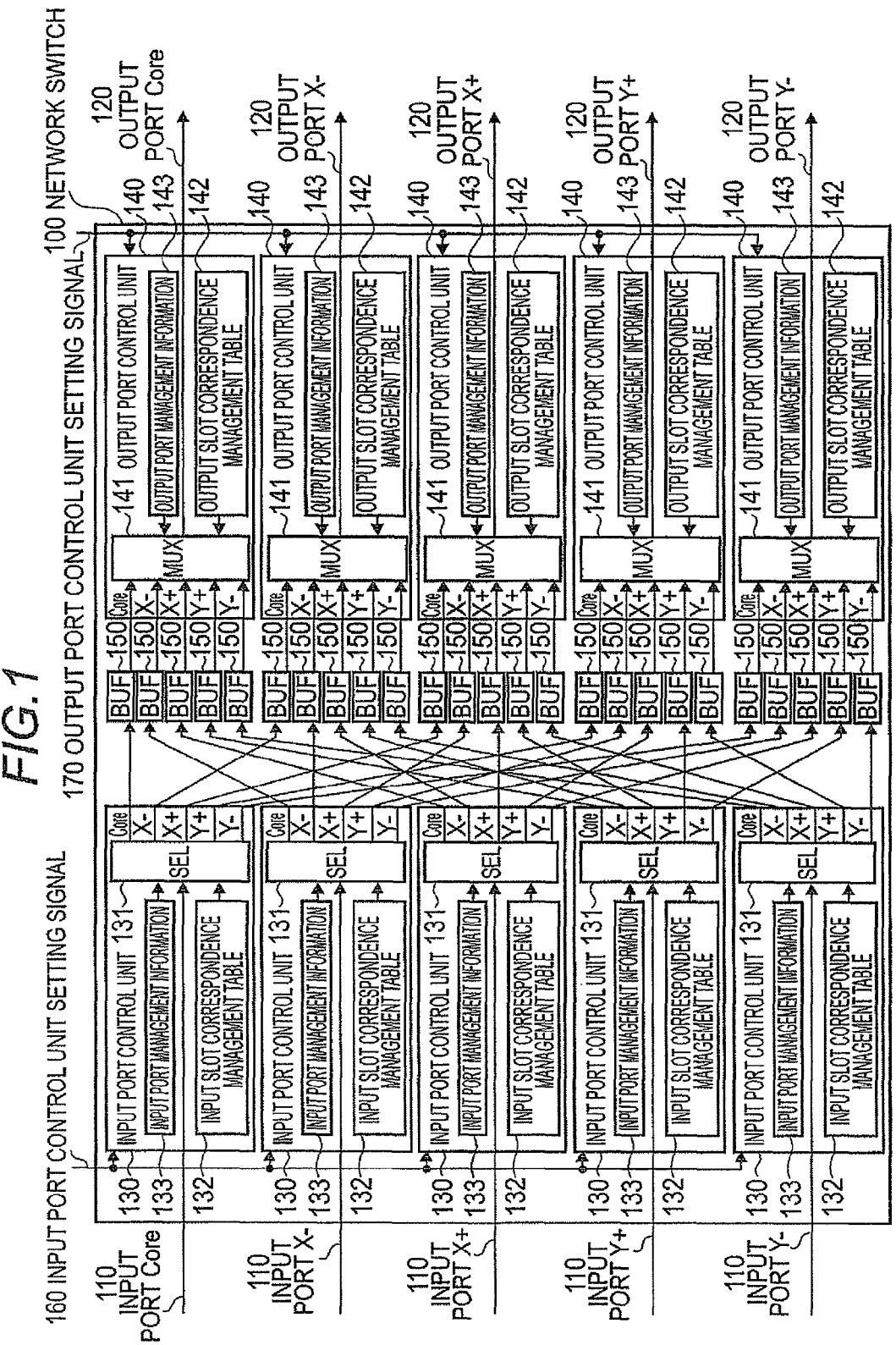
{FIG. 1} A block diagram showing the configuration of a network switch according to an exemplary embodiment of the present invention.

FIG. 1 is a block diagram showing the configuration of a network switch 100 using an interprocessor communication system according to an exemplary embodiment of the present invention. The network switch 100 shown in FIG. 1 includes a plurality of (five in FIG. 1) input ports 110; a plurality of (five in FIG. 1) output ports 120; input port control units 130, which correspond to each input port 110; output port control units 140, which correspond to each output port 120; and a plurality of buffers BUF150, which act as intermediaries in transferring data from each input port 110 to each output port 120. Among the above, a plurality of input ports 110 and input port control units 130 corresponds to a plurality of input units, a plurality of output ports 120 and output port control units 140 to a plurality of output units, and a plurality of buffers BUF150 to a plurality of buffer units.

The input port control units 130 each include a selection unit SEL131, which selects an output-port-side buffer BUF150 to which data of an input port 110 are transferred; an input slot correspondence management table 132, which manages information about to which output-port-side buffer BUF150 the data of the input port 110 are transferred; and input port management information 133, which is used to control a communication bandwidth of the input port 110.

The output port control units 140 each include a multiplexing unit MUX141, which selects an input-port-side buffer BUF150 from which data is transferred to an output port 120 and which multiplexes and outputs the data; an output slot correspondence management table 142, which manages information about how the data is multiplexed; and output port management information 143, which is used to control a communication bandwidth of the output port 120.

An operation of each input port control unit 130 Can be altered by an input port control unit setting signal 160. An operation of each output port control unit 140 can be altered by an output port control unit setting signal 170.

The network switch 100 shown in FIG. 1 represents a five-input, five-output structure. However, the present invention is not limited to the above. It is easy to change the network switch 100 to another structure, i.e. a N-input, N-output structure.

Figure 2:
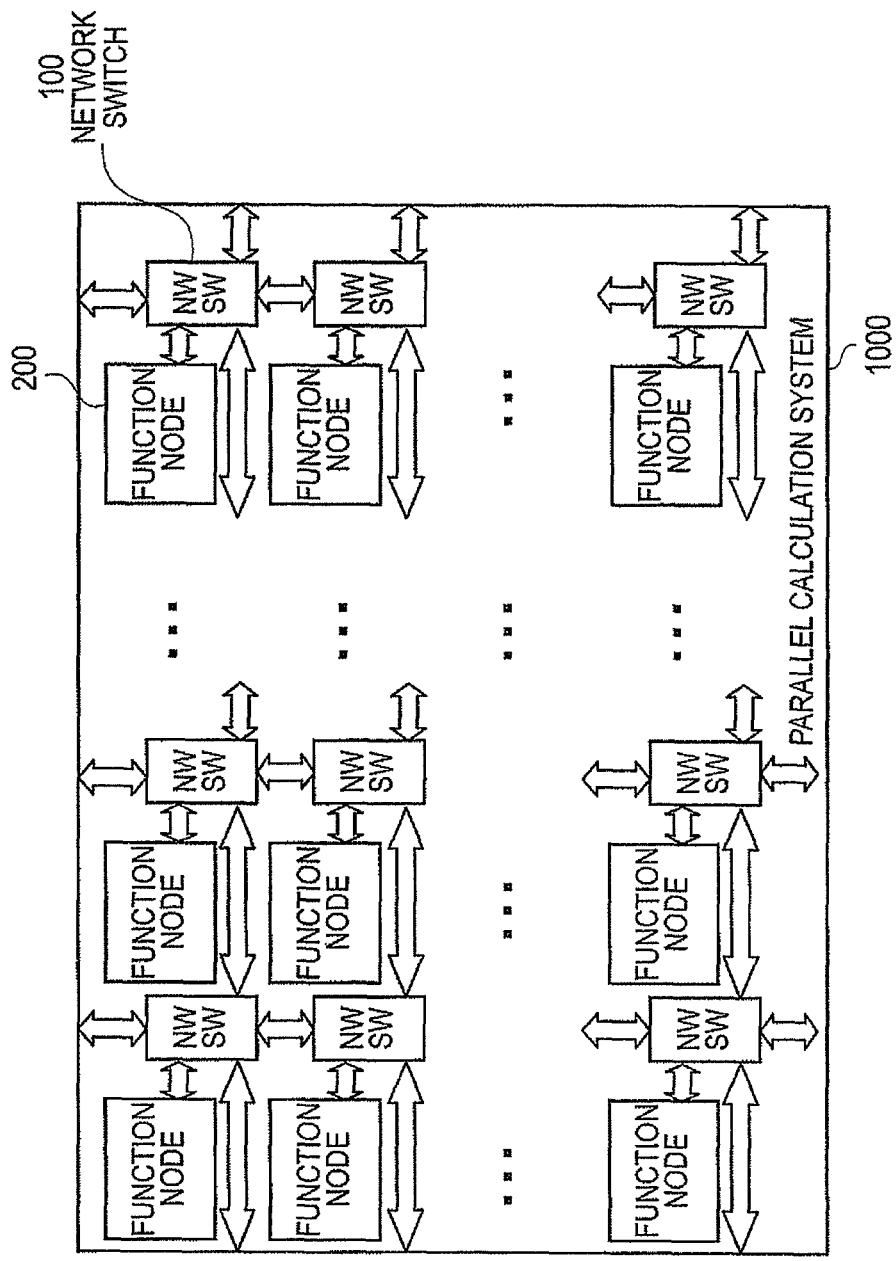
{FIG. 2} A block diagram showing an example of the configuration of a parallel calculation system having a two-dimensional mesh structure using the network switch shown in FIG. 1.

FIG. 2 shows an example of the configuration of a parallel calculation system 1000 having a two-dimensional mesh structure using network switches 100. The parallel calculation system 1000 shown in FIG. 2 includes a plurality of function nodes 200 and a plurality of network switches 100.

The network switches 100 form two-dimensional lattice-like communication paths. There is each function node 200 corresponding to each network switch 100. Accordingly, a network switch 100 includes five input ports and five output ports to transfer data to or from other four network switches 100, i.e. adjacent upper, lower, left and right network switches shown in the diagram, as well as to or from an adjacent one function node 200.

The function nodes 200 are processing constituents having functions such as a calculation function, storage function, or IO function. The function nodes 200 are not confined to one function; there may be function nodes having a plurality of different functions.

The parallel calculation system 1000 shown in FIG. 2 is an example of a two-dimensional mesh structure. However, the present invention is not limited to the above. Another kind of topology may adopted to form the parallel calculation system 100.

Figure 3:
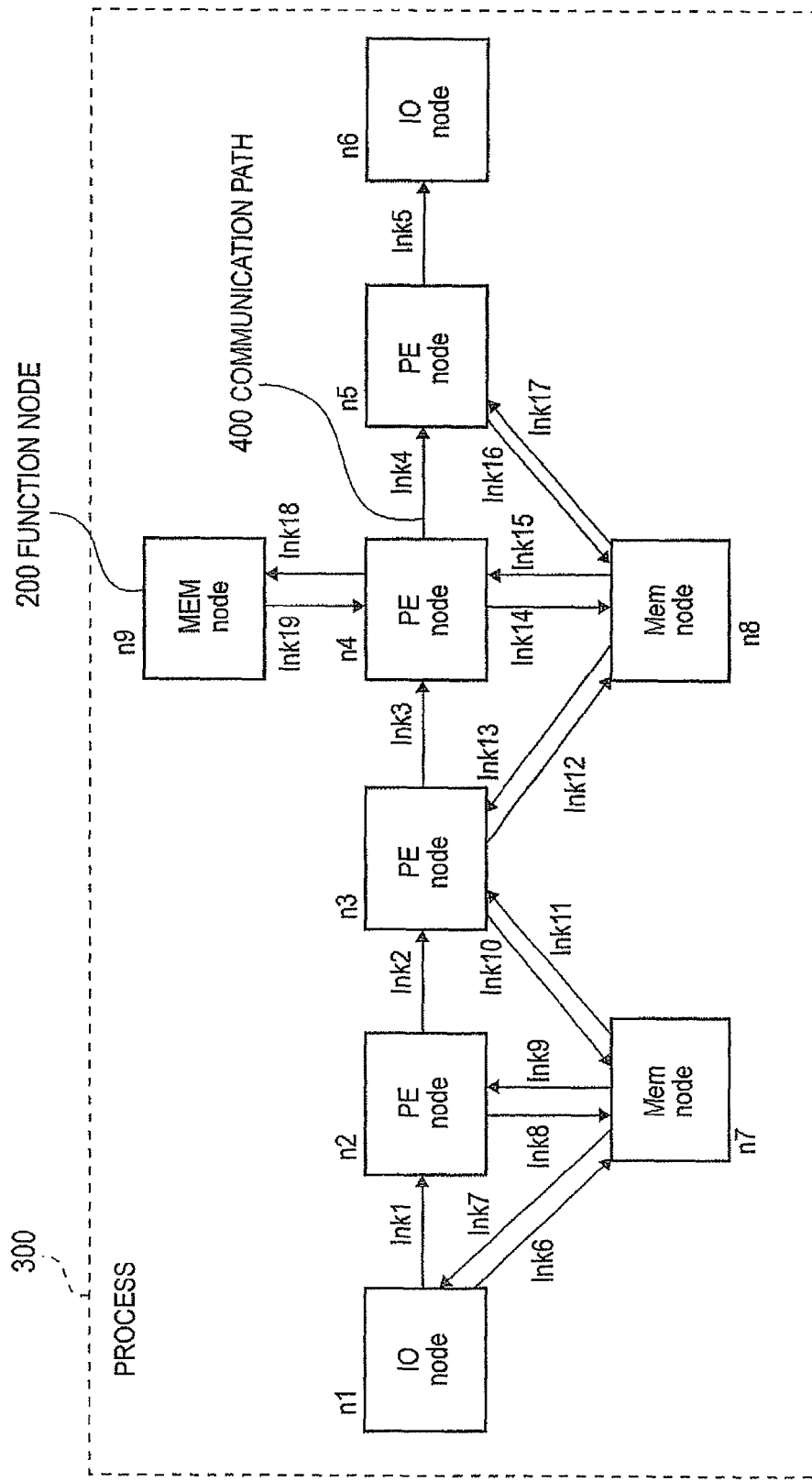
{FIG. 3} An example of the configuration of a process including a plurality of function nodes shown in FIG. 2.

FIG. 3 shows an example of the configuration of a process 300 formed by a plurality of function nodes 200. The process 300 is a series of processes designed for a given purpose, including the functions of inputting data, calculating, and outputting and other functions. FIG. 3 shows an example of the process 300 consisting of two IO nodes (n1 and n6) for inputting and outputting, four calculation nodes (n2, n3, n4, and n5) for calculation, and storage nodes (n7, n8, and n9) for storing data such as interim results of processing. Each of the function nodes 200 that make up the process includes a communication path (lnk1, lnk2, . . . , lnk19) 400 to transfer data from one node to another. In order for the process 300 as a whole to efficiently carry out processing, a process of transferring data needs to be performed with a sufficient communication bandwidth on the communication paths 400.

Figure 4:
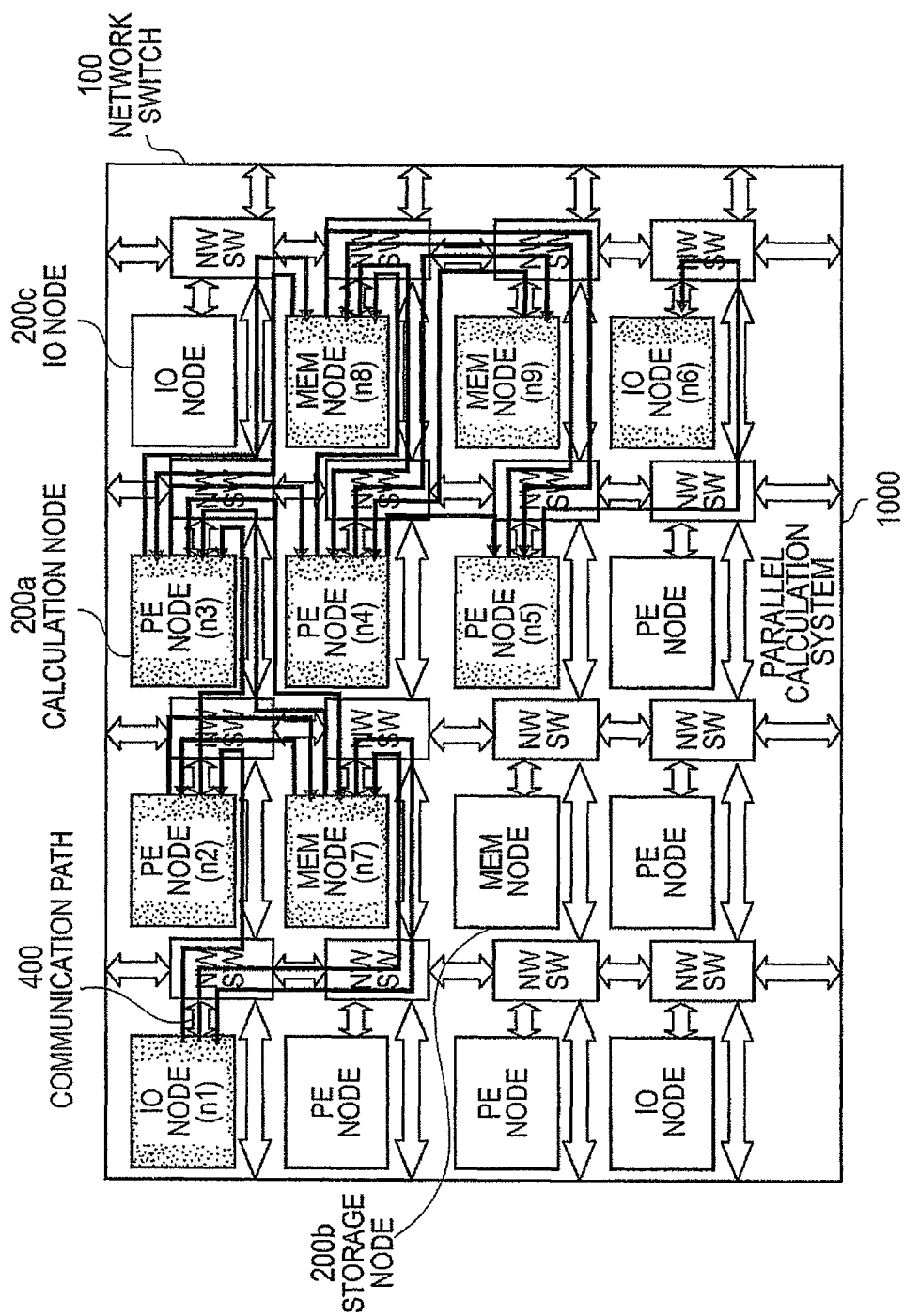
{FIG. 4} A block diagram illustrating a mapping example of the case where the process shown in FIG. 3 is mapped onto the parallel calculation system shown in FIG. 2.

FIG. 4 shows an example in which the process 300 shown in FIG. 3 is mapped onto the parallel calculation system 1000 shown in FIG. 2. The parallel calculation system 1000 shown in FIG. 4 includes eight calculation nodes 200a, four storage nodes 200b, and four IO nodes 200c. Each function node of the process 300 is assigned to the above function nodes. The communication paths 400 between the function nodes are made up of a plurality of network switches 100. In order for the mapped process 300 to achieve a predetermined level of performance, each function node 200 needs to carry out processing at a predetermined level of performance. Moreover, each communication path 400 needs to guarantee a predetermined communication bandwidth to transfer data.

Figure 5:
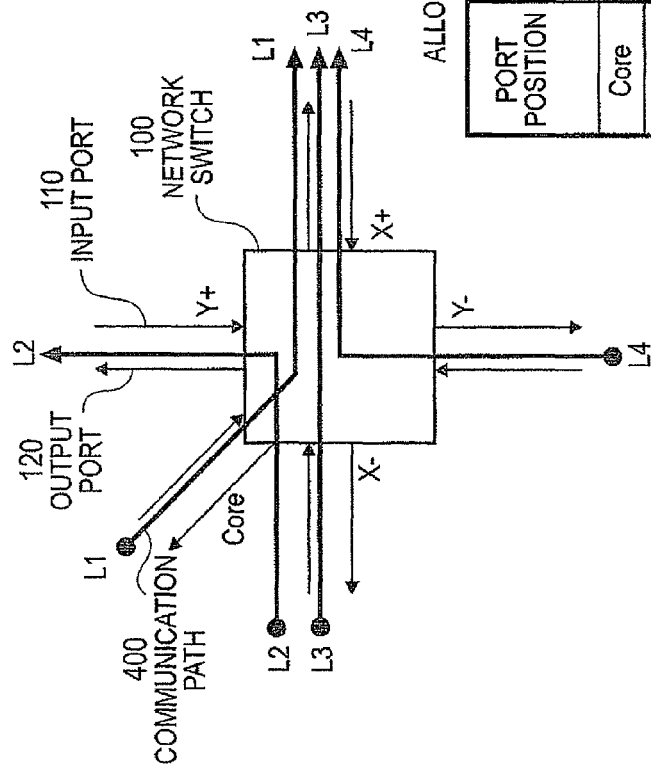
{FIG. 5} Explanatory diagrams, FIG. 5A to 5C, showing an example of assigning communication bandwidths to input/output ports of a network switch.

FIG. 5 shows the way a communication bandwidth required for the network switch 100 is assigned.

FIG. 5A shows a plurality of communication paths 400 that pass through the network switch 100. In this case, four communication paths (links) 400, L1, L2, L3 and L4, pass through one network switch 100. The network switch 100 includes input ports 110 and output ports 120 at X−, X+, Y−, and Y+ sides and at a Core side: the X−, X+, Y−, and Y+ sides correspond to the sides of the other four network switches 100, which are adjacent to the network switch 100 along the X and Y directions, which cross each other at right angles, of a two-dimensional mesh structure; and the Core side corresponds to the side of one adjoining function node 200. In a process of transferring data on a communication path L1, data is input into the network switch 100 from the Core-side input port 110 and then output from the X+ side output port 120. The X− side input port 110 is shared by two communication paths L2 and L3. The X+ side output port 120 is shared by three communication paths L1, L3 and L4.

FIG. 5B shows an example of a communication bandwidth requested by each communication path 400. The value of bandwidth is the transfer capability per unit time, represented by using, as a unit, a minimum value (referred to as w) of a feasible communication bandwidth.

FIG. 5C shows the communication bandwidths that should be assigned to each input port 110 and output port 120 of the network switch 100 when a communication path 400 makes a request for a communication bandwidth of FIG. 5B.

According to the present exemplary embodiment, in a process of assigning the communication bandwidth, in the range of one time as large as the minimum communication bandwidth w (1w) to the maximum communication bandwidth (Nw), the communication bandwidth can be set to a given integral multiple of the minimum communication bandwidth (w). The communication bandwidths of the input port 110 and the output port 120 may be set as the operating frequencies of the input port 110 and the output port 120. For example, if the operating frequency for realizing the minimum communication bandwidth w is represented by f, setting the integral multiples of the frequency, 1f, 2f, 3f, . . . , and Nf, leads to the realization of arbitrary communication bandwidths, ranging from one to N times as large as the minimum communication bandwidth w.

In the network switch 100 of the present exemplary embodiment, the input port management information 133 of each input port control unit 130 makes it possible to set the operating frequency of the input port 110. The output port management information 143 of each output port control unit 140 makes it possible to set the operating frequency of the output port 120. In the case of FIG. 5, for ease of explanation, what is shown here is an example in which, relative to the minimum communication bandwidth, the power of 2, i.e. two, four or eight times, is used for setting. However, the following description can be applied even in the case where the setting is performed using an arbitrary integral multiple.

In the case of FIG. 5, the input port 100 at the X− side port position is shared by two communication paths L2 and L3; the communication bandwidths 2w and 4w requested by two communication paths L2 and L3, i.e. a total communication bandwidth of 6w or more, are required to be assigned. In this case, if the maximum communication bandwidth is 8w, the maximum communication bandwidth of 8w is assigned to the input port 100 at the X− side port position. The output port 120 at the X+ port position is shared by three communication paths L1, L3 and L4. The requested communication bandwidths 1w, 4w and 3w turn out to be 8w in total. Therefore, the communication bandwidth of 8w is assigned. There is no communication path 400 passing through the Y+ or X+ side input port 100. Therefore, no communication bandwidth is assigned. Similarly, there is no communication path 400 passing through the Core, Y− or X− side output port 120. Therefore, no communication bandwidth is assigned.

Figure 6:
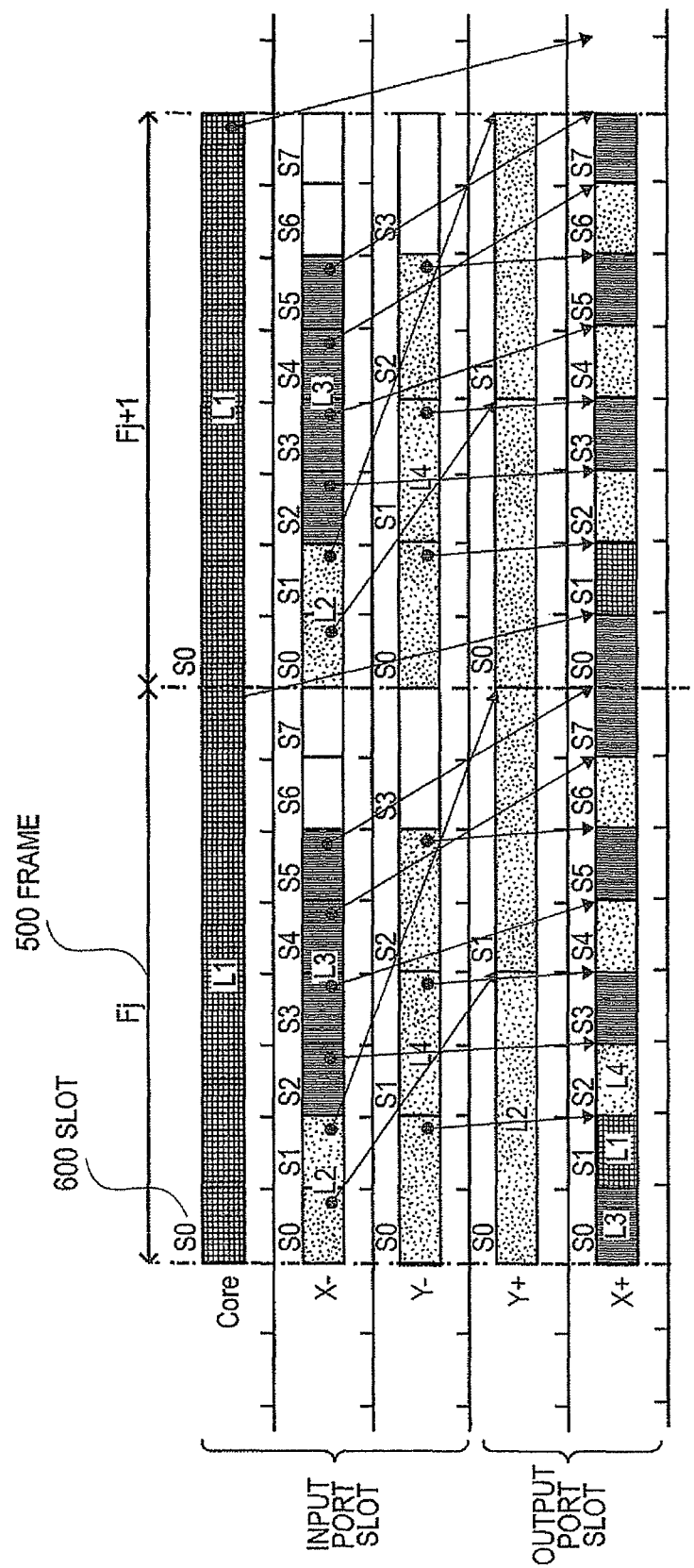
{FIG. 6} A timing chart illustrating an operation of transferring data in accordance with the example of assigning input port's slots and output port's slots shown in FIG. 5.

FIG. 6 shows how data specified by each communication path 400 is transferred in the network switch 100 illustrated in FIG. 5.

According to the present exemplary embodiment, data, which are transferred between nodes, are assigned to slots that are created by dividing a unit of time into a plurality of sections, and are transferred in a time-division multiplex manner. The unit of time is referred to as a frame 500. If the frame 500 at a given time is represented by Fj, the following frame 500 is represented by Fj+1. A time section of the frame 500 is divided into one, two, . . . , and N in response to the minimum communication bandwidth w to the maximum communication bandwidth Nw. The divided frames 500 are referred to as slots 600. If the division number is k, the slots 600 are identified by S0, S1, . . . , and Sk-1 in order of time. In the case of FIG. 5, the maximum communication bandwidth Nw is 8w (N=8), and the division number k is 8; the slots 600 are identified by S0, S1, . . . , and S7.

FIG. 6 shows the frame 500 that is divided at each input port 110 and at each output port 120 as communication bandwidths are assigned to each input port 110 and each output port 120 illustrated in FIG. 5C. Input/output ports to which communication bandwidths are not assigned are not shown.

Only the communication path L1 passes through the Core side input port 110; the minimum communication bandwidth w is assigned. Accordingly, the frame 500 of the Core side input port 110 is divided into one, meaning that the frame 500 includes only one slot S0.

The X− side input port 110 is shared by two communication paths L2 and L3, which request communication bandwidths 2w and 4w, respectively. A communication bandwidth of 8w, which is greater than 6w, is assigned given the following equation: 2w+4w=6w. As a result, the frame 500 of the X− side input port 110 is divided into eight, meaning that the frame 500 includes eight slots 600. Regardless of how the frame 500 is divided, each slot 600 needs to have the minimum communication bandwidth w. Therefore, the X− side input port 110 operates at high speed to realize a communication bandwidth eight times as large as the minimum communication bandwidth w. Of the eight slots 600 of the X− side input port 110, S0 and S1 are assigned to the communication path L2, and S2, S3, S4 and S5 to the communication path L3.

The communication path L2 is assigned to the Y+ side output port 120. Since the communication path L2 makes a request for a communication bandwidth of 2w, a communication bandwidth of 2w is assigned to the Y+ side output port 120.

The X+ side output port 120 is shared by three communication paths L1, L3 and L4, which make requests for communication bandwidths of 1w, 4w and 3w, respectively. Therefore, a communication bandwidth of 8w is assigned given the following equation: 1w+4w+3w=8w.

The four communication paths L1, L2, L3 and L4 are each assigned to the slots 600 of the Core side, X− side, and Y− side input ports 110, and are input to the network switch 100. The communication path L1 is assigned to the slot S0 of the Core side input port 110, the communication path L2 to the slots S0 and S1 of the X− side input port 110, the communication path L3 to the slots S2, S3, S4 and S5 of the X− side input port 110, and the communication path L4 to the slots S0, S1 and S2 of the Y− side input port 110.

Similarly, the four communication paths L1, L2, L3 and L4 are each assigned to the slots 600 of the Y+ side and X+ side output ports 120, and are output from the network switch 100. The communication path L1 is assigned to the slot S1 of the X+ side output port 120, the communication path L2 to the slots S1 and S0 of the Y+ side output port 120, the communication path L3 to the slots S3, S5, S7 and S0 of the X+ side output port 120, and the communication path L4 to the slots S2, S4 and S6 of the X+ side output port 120.

In FIG. 6, arrows indicate how the slots 600 of the input ports 110 of each communication path are associated with the slots 600 of the output ports 120. How the slots are associated with each other will be described with the communication path L3 taken as an example.

Suppose the slot 600 of the input port 100 is SI and that the slot 600 of the output port 120 is SO. Assignment takes place in such a way that the temporal relationship between the input port slot SI and the output port slot SO satisfies the following condition.

Ending Time of Input Port Slot SI≤Beginning Time of Output Port Slot SO (Equation 1)

Suppose that the frame 500 to which the input port slot SI belongs is Fj. When the condition of equation 1 is satisfied and when the time section of the frame Fj does not contain the slot 600 of the output port 120 that is not associated with the slot 600 of another input port 110, the output port slot SO becomes associated with the slot 600 of the output port 120 of the frame Fj+1, which is the next time section that comes after the frame Fj.

For example, in FIG. 6, the slot S0 of the Core side input port 110 of the communication path L1 is associated with the slog S1 of the X+ side output port 120 of the next frame 500. The slot S5 of the X− side input port 110 of the communication path L3 is associated with the slot S0 of the X+ side output port 120 of the next frame 500.

When the communication bandwidths assigned to each input port 110 and each output port 120 are equal to or greater than the sum total of communication bandwidths requested by communication paths 400 passing through each input port 110 and each output port 120, it is possible to associate the slots 600 of the input ports 110 with the slots 600 of the output ports 120 in a way that always satisfies the condition of equation 1.

According to the present exemplary embodiment, two kinds of management table, i.e. the input slot correspondence management table 132 and the output slot correspondence management table 142, are used to make it possible to associate the slots 600 of the input ports 110 with the slots 600 of the output ports 120. The input port control units 130 of the network switch 100 each manage, as the input slot correspondence management table 132, how each slot 600 of the corresponding input port 110 is associated with an output port 120, i.e. to which output port 120 each slot 600 of the corresponding input port 110 is transferred.

Figure 7:
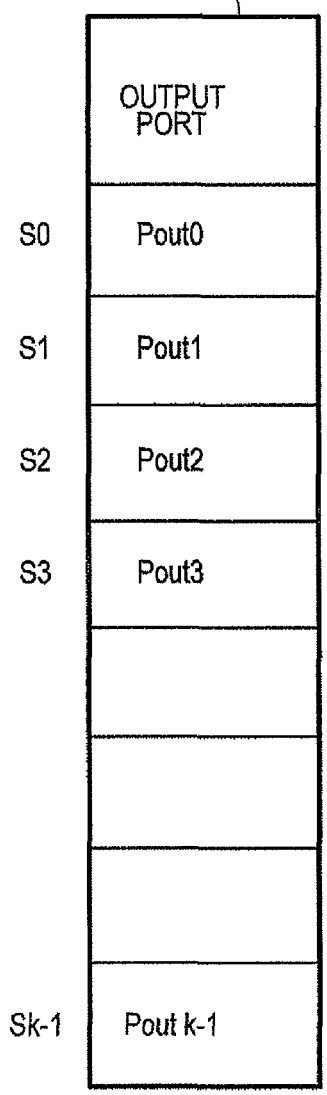
{FIG. 7} A diagram showing an example of the configuration of an input slot correspondence management table shown in FIG. 1.

FIG. 7 shows an example of the configuration of the input slot correspondence management table 132. When the frame 500 of the input port 110 is divided into k slots 600, the input slot correspondence management table 132 can be realized as a one-dimensional table having k entries corresponding to the input slots S0, S1, . . . , and Sk-1. In each entry, identification information of an output port 120 that should be transferred is stored. The output port control units 140 of the network switch 100 each manage, as the output slot correspondence management table 142, how each slot 600 of the corresponding output port 120 is associated with an input port 110, i.e. from which input port 110 data are transferred to each slot 600 of the corresponding output port 120.

Figure 8:
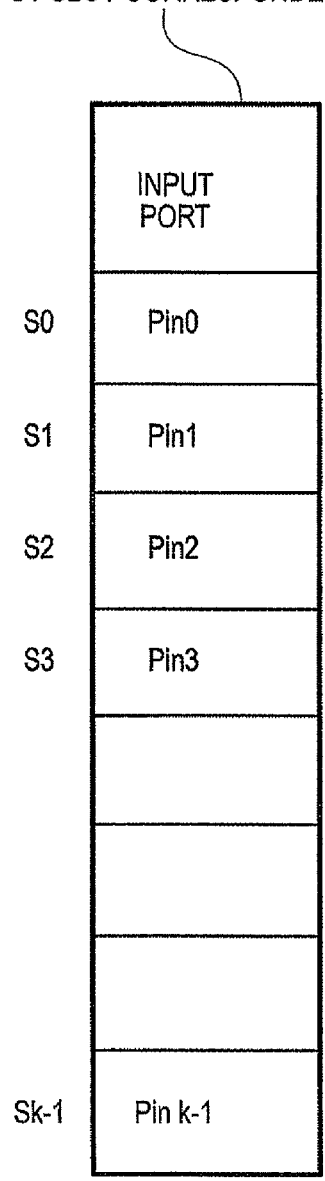
{FIG. 8} A diagram showing an example of the configuration of an output slot correspondence management table shown in FIG. 1.

FIG. 8 shows an example of the configuration of the output slot correspondence management table 142. When the frame 500 of the output port 120 is divided into k slots 600, the output slot correspondence management table 142 can be realized as a one-dimensional table having k entries corresponding to the output slots S0, S1, . . . , and Sk-1. In each entry, identification information of an input port 110 that should be transferred to each output slot 600 is stored.

The input port control units 130 of the network switch 100 transfer data of the slots 600 of the input ports 110 to the buffers BUF150 of the specified output ports 110 on the basis of the information of the input slot correspondence management table 132. When the input slot correspondence management table 132 is configured as shown in FIG. 7, the selection units SEL131 select the buffers to which data are to be transferred so that data of the slots 600, which are S0, S1, . . . , and Sk-1 that reach the input ports 110 in that order, are transferred to the buffers BUF 150 that are specified by the output port identification information of the input slot correspondence management table 132.

The output port control units 140 of the network switch 100 determine from which input-side buffers BUF 150 data are transferred to the slots 600 of the output ports 120 on the basis of information of the output slot correspondence management table 142, and output data to the slots 600 of the output ports 120 after multiplexing the data. When the output slot correspondence management table 142 is configured as shown in FIG. 8, data, which should be output in order of the slots S0, S1, . . . , and Sk-1 of the output ports 120, are taken out from the buffers BUF150 specified by the input port identification information of the output slot correspondence management table 142, and multiplexed by the multiplexing units MUX141 before being output from the output ports 120.

With the use of the above, it is possible to guarantee the communication bandwidths requested by each communication path 400 and carry out communication. Moreover, each input port 110 of the network switch 100 can operate at a minimum speed that makes it possible to realize the communication bandwidths requested by each output port 120.

The following describes algorithms for creating the input slot correspondence management table 132 and the output slot correspondence management table 142.

Suppose that the operation illustrated in FIG. 4 of mapping processes onto the parallel calculation system 1000 has been completed. A question of how to determine which specific network switch 100 a communication path 400, connecting the function nodes 200, passes through is known as a path finding problem, for which many algorithms have been proposed. Therefore, suppose that a determination has been made as to from which input ports 110 the communication paths 400, passing through each network switch 100, are input, as well as from which output ports 120 the communication paths 400 are output, as shown in FIG. 5A.

As described below, it is possible to make a determination as to which communication path 400 is assigned to each slot 600 of the input ports 110.

A determination is made by the following as to which communication path 400 is assigned to the slot 600 of each input port 110 of the network switch 100: the output port control unit 140 of the output port 120 of the network switch 100 that comes before the outputting of data to the input port 110. Going further back in time, the determination is made by the output port 120 of the function nodes 200 that make up the parallel calculation system 1000. To the output port 120 of the function nodes 200, a required number of slots for the communication bandwidth of the communication path 400 passing through the output port 120 is assigned. The assigned slots 600 may be associated with the communication paths 400 in an arbitrary manner.

If how each slot 600 of the input ports 110 of the network switch 100 is associated with a communication path 400 is already known, it is clear from the input slot correspondence management table 132 and the output slot correspondence management table 142 how the slots 600 of the input ports 100 are associated with the slots 600 of the output ports 120. That is, it is clear how the communication paths 400 are associated with the slots 600 of the output ports 120.

Regarding all the communication paths 400 passing through the network switch 100 as well as all network switches 100 ranging from the source function nodes 200 of the communication paths 400 to the network switches 100, the above procedure is repeated. Therefore, it is possible to find the communication path 400 associated with each slot 600 of the input ports 110 of the network switches 100. A question of to which output ports 120 the data of the communication paths 400 input from the input ports 110 should be transferred has been already calculated by a path finding algorithm. Therefore, all that is required is to store, in an entry of each slot S0, S1, . . . , or Sk-1 of the input slot correspondence management table 132 of the input ports 110, the identifier of an output port 120 to which data of a corresponding communication path 400 should be transferred.

Figure 9:
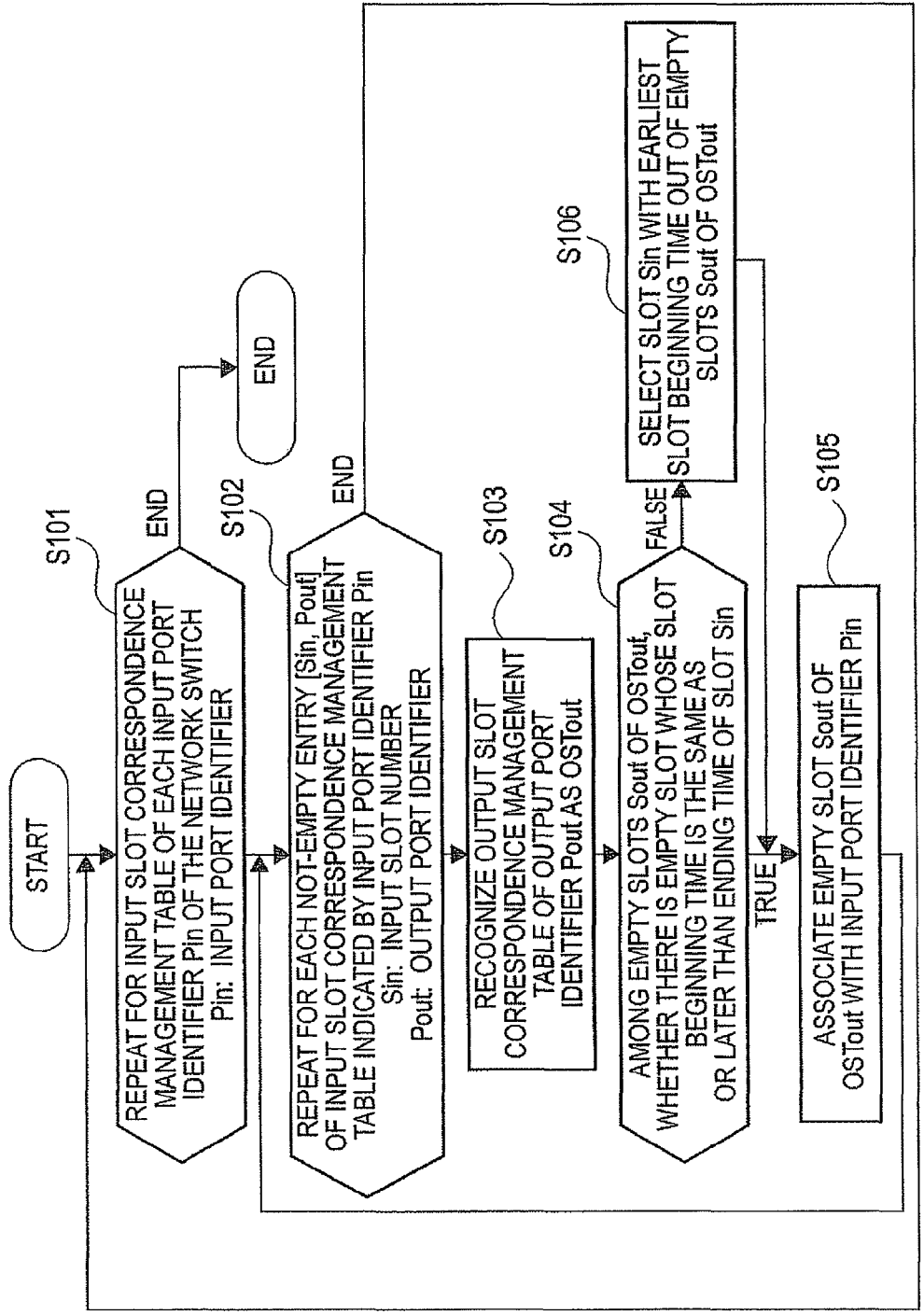
{FIG. 9} A flowchart showing an algorithm for creating the output slot correspondence management table shown in FIG. 1.

With the use of FIG. 9, the following will be described: a method of creating the output slot correspondence management tables 142 of the output port control units 140 of the network switches 110. Suppose that the input slot correspondence management table 132 of each input port 110 of the network switch 100 has been provided.

At step S101, as for each input port 110 of the network switch 100, steps S102 to S106 are repeated. During a process of repeating steps S102 to S106, a selected input port 110 is identified by input port identifier Pin.

At step S102, for each not-empty entry [Sin, Pout] of the input slot correspondence management table 132 indicated by the input port identifier Pin, steps S103 to S106 are repeated. In this case, an input slot number is represented by Sin, and an output port identifier of an output port 120 to which data of Sin should be transferred is represented by Pout.

At step S103, the output slot correspondence management table 142 of the output port identifier Pout is recognized as OSTout.

In a process of determining a condition at step S104, among empty slots Sout of OSTout, a determination is made as to whether there is an empty slot whose slot beginning time is the same as or later than the ending time of the slot Sin. If there is an empty slot, the input port identifier Pin becomes associated with the empty slot Sout of OSTout at step S105. If there is no empty slot Sout in OSTout that meets the condition of step 104, it turns out that the input-side slot Sin cannot be associated with an output-side slot in the same frame 500. As a result, the input-side slot Sin becomes associated with an output-side slot in a slot of the next frame 500 that comes after the current frame 500 (Step S106).

If communication bandwidths are assigned, as shown in FIG. 5C, to each input port 110 and each output port 120 of the network switch 100, it is definitely possible to carry out an associating process for the slots 600 of each input port 110 of the network switch 100 in a way that satisfies the condition of equation 1 with the use of the above procedure.

Besides the one described above, various algorithms are conceivable in creating the input slot correspondence management table 132 and the output slot correspondence management table 142. The network switch 100 of the present exemplary embodiment works properly even when an arbitrary associating method is used, as long as the condition of equation 1 is satisfied.

The following describes an operation of the input port control unit 130 of each input port 110 of the network switch 100 and an operation of the output port control unit 140 of each output port 120 with reference to a flowchart.

Figure 10:
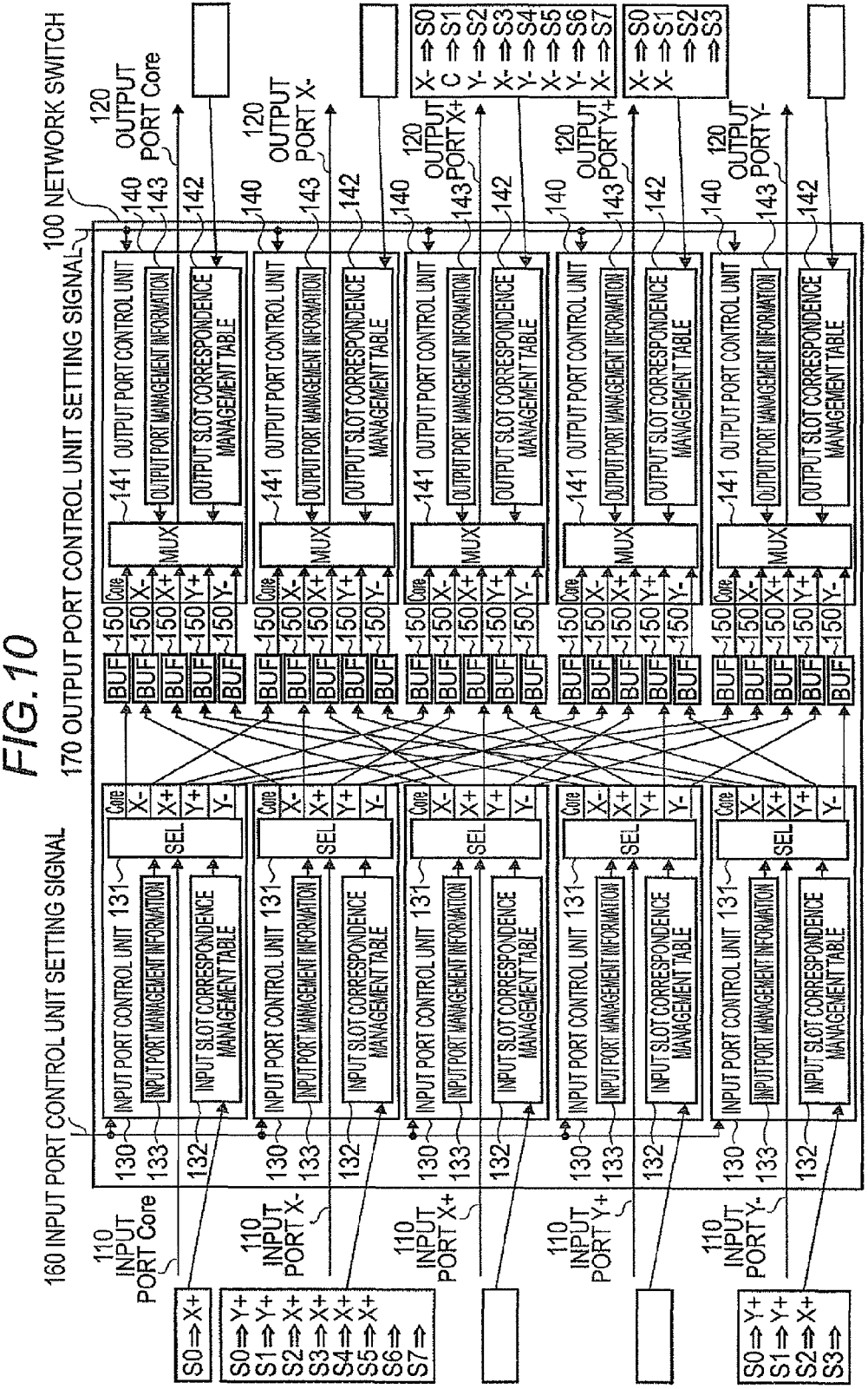
{FIG. 10} A block diagram showing an example of how the input/output slot correspondence management tables shown in FIG. 1 are set.

FIG. 10 shows an example of how to set the input slot correspondence management table 132 and the output slot correspondence management table 142, which corresponds to an example of how to assign slots as illustrated in FIG. 6.

Figure 11:
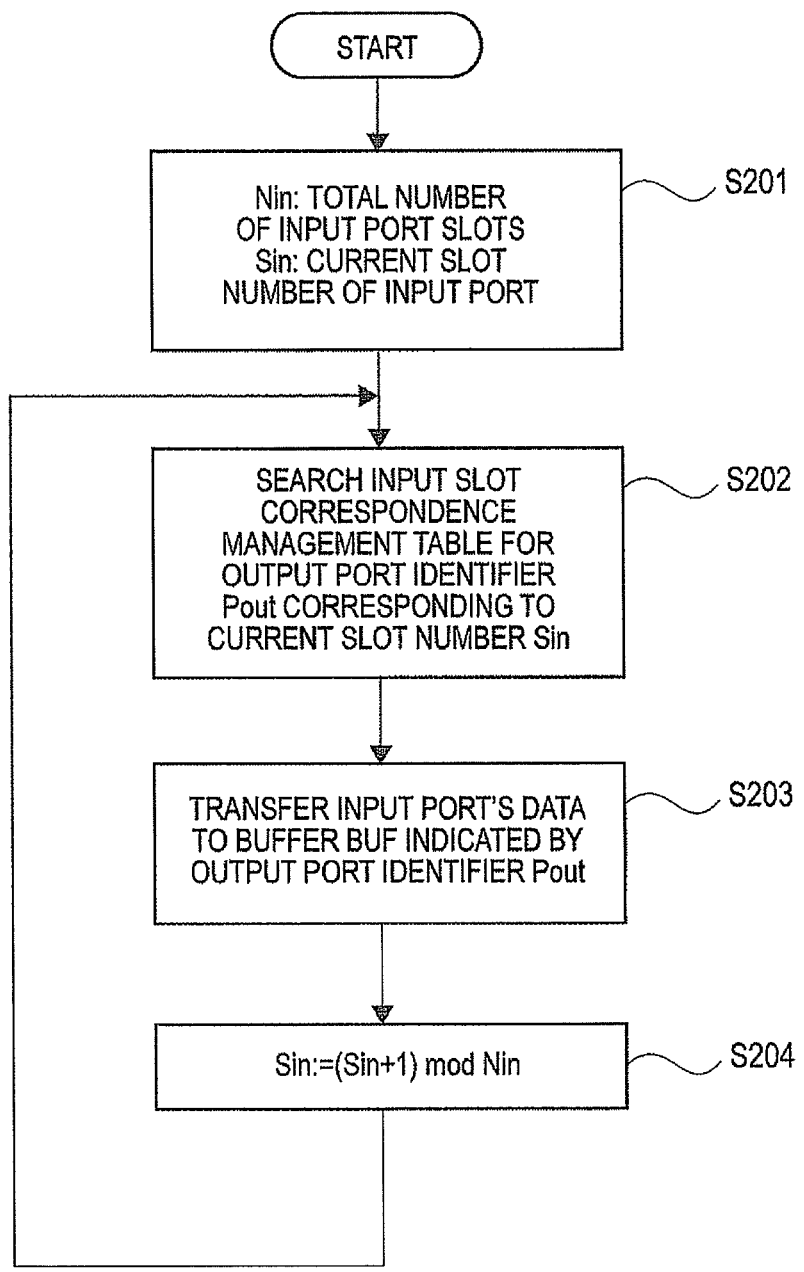
{FIG. 11} A flowchart illustrating an operation of an input port control unit shown in FIG. 1.

FIG. 11 is a flowchart showing an operation of the input port control unit 132. Suppose that the total number of slots 600 of the input ports 110 of the network switch 100 is Nin, and the current slot number of the input port 110 Sin (Step S201). The input port control unit 130 repeats steps S202 to S204.

A process at step S202 is to search the input slot correspondence management table 132 for an output port identifier Pout corresponding to the current slot number Sin. At step S203, data of the input port 110 is transferred to the buffer BUF150 indicated by the output port identifier Pout. As a result, the data of the input port 110 is transferred to a predetermined output port 120. At step S204, the current slot number Sin of the input port 110 is updated.

The input port control unit 130 performs a process at step S203 of transferring data in synchronization with the start and end of a slot 600 of the input port 110. The information required for the synchronization includes a time interval of the slot 600 and the total number of slots. The above information is stored in the input port management information 133. The input port control unit 130 is also able to set an operating frequency according to a communication bandwidth requested by the input port 110. It is possible to set the operating frequency in the input port management information 133.

Figure 12:
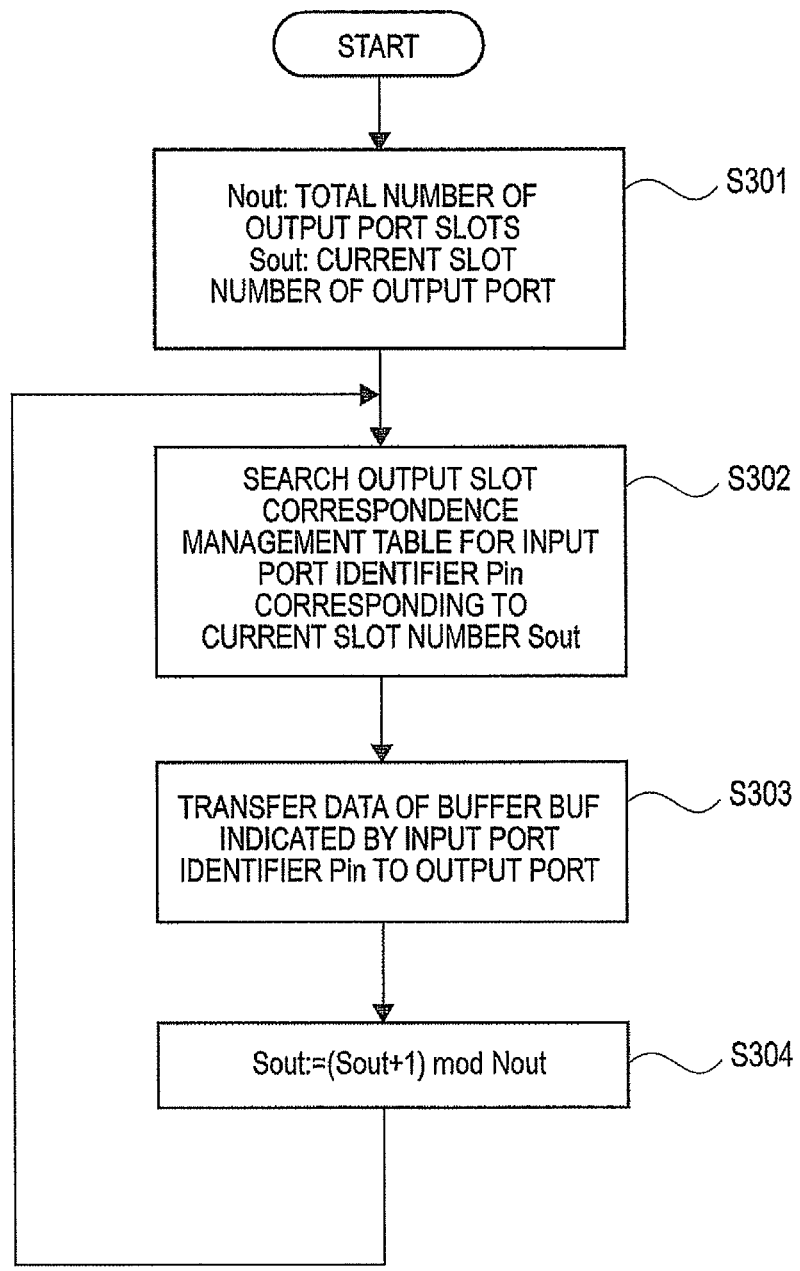
{FIG. 12} A flowchart illustrating an operation of an output port control unit shown in FIG. 1.
Figure 13:
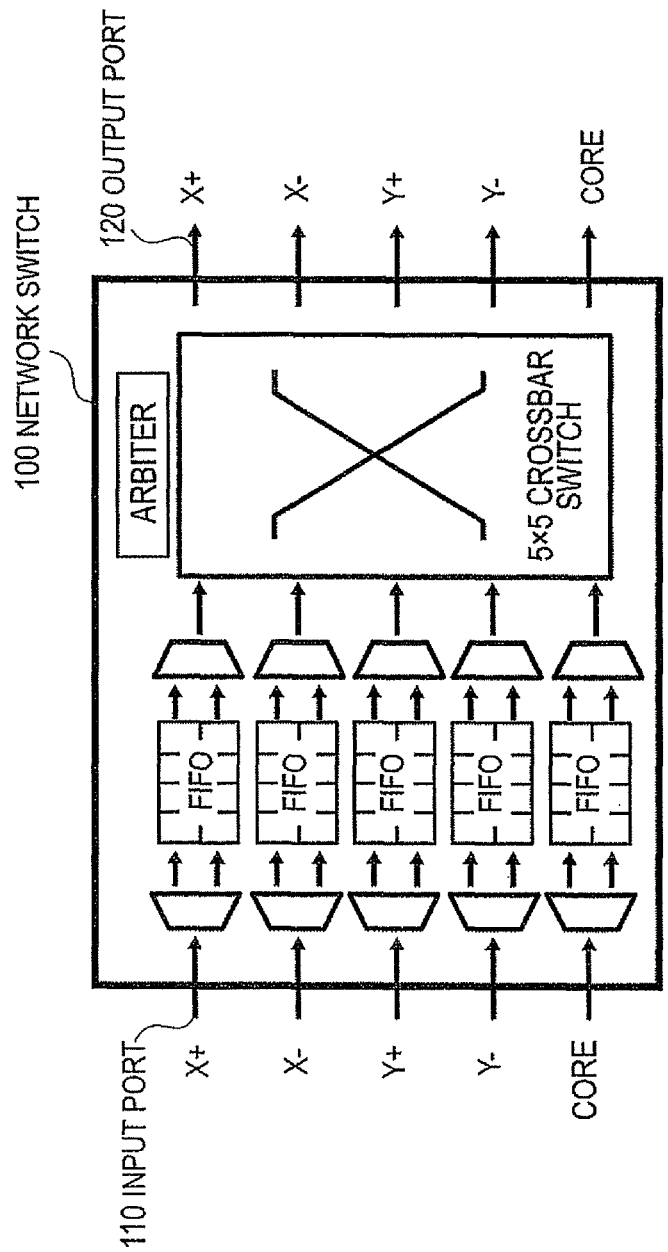
{FIG. 13} A block diagram showing an example of the configuration of a network switch for on-chip network, disclosed in NPL 1.
Figure 14:
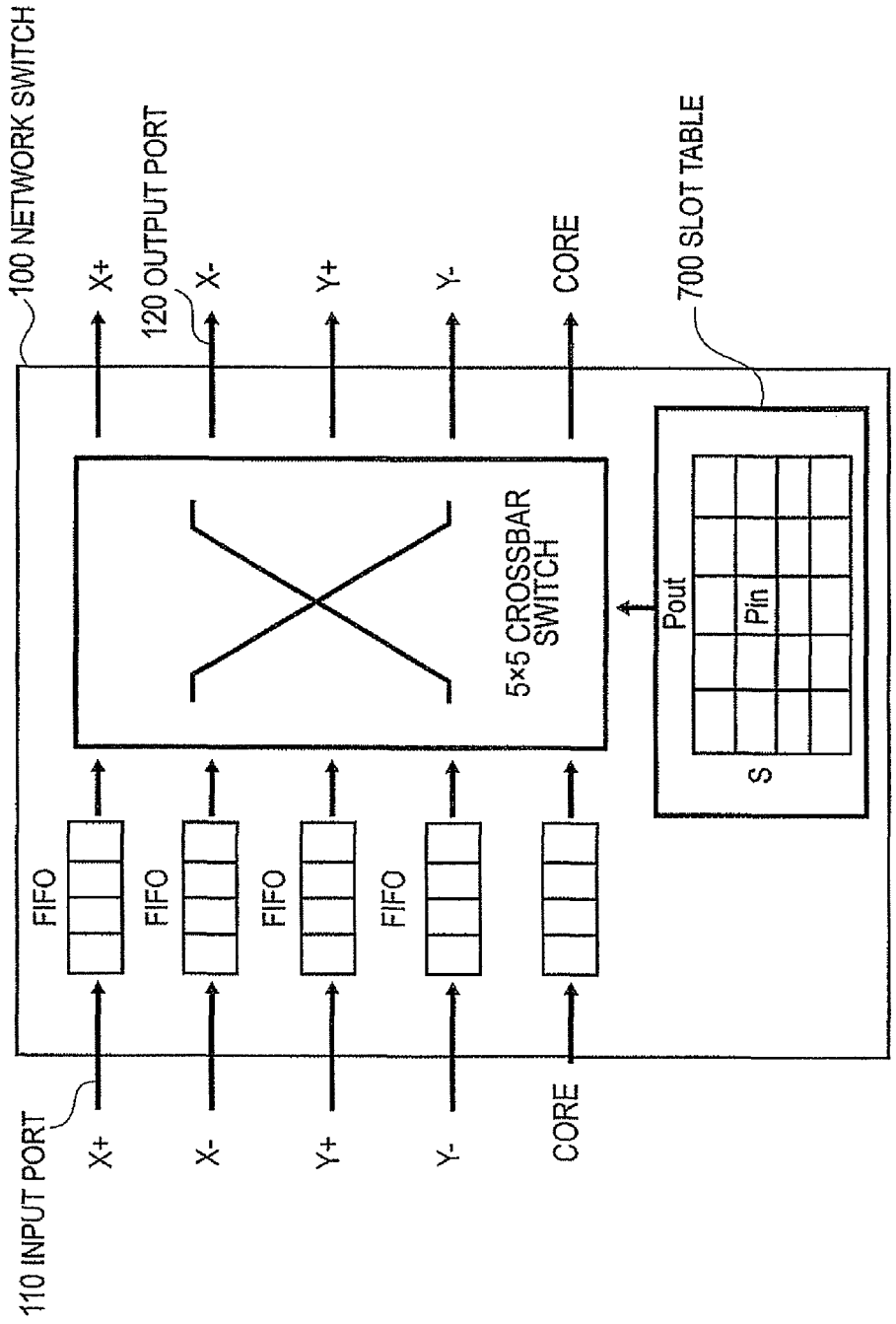
{FIG. 14} A block diagram showing an example of the configuration of a time-division multiplex switch, disclosed in PTL 1.

FIG. 12 is a flowchart showing an operation of the output control unit 142. Suppose that the total number of slots 600 of the output ports 120 of the network switch 100 is Nout, and the current slot number of the output port 120 Sout (Step S301). The output port control unit 140 repeats steps S302 to S304.

A process at step S302 is to search the output slot correspondence management table 142 for an input port identifier Pin corresponding to the current slot number Sout. At step S303, data of the buffer BUF150 indicated by the input port identifier Pin is transferred to the output port 120. At step S304, the current slot number Sout of the output port 120 is updated.

The output port control unit 140 performs a process at step S303 of transferring data in synchronization with the start and end of a slot 600 of the output port 120. The information required for the synchronization includes a time interval of the slot 600 and the total number of slots. The above information is stored in the output port management information 143. The output port control unit 140 is also able to set an operating frequency according to a communication bandwidth requested by the output port 120. It is possible to set the operating frequency in the output port management information 143.

According to the present exemplary embodiment, each input port control unit 130 of the network switch 100 and each output port control unit 140 can operate at different operating frequencies. Therefore, the input and output of a buffer BUF150 are so formed as to be able to operate at different frequencies.

As described above, the data transferred between the function nodes 200 are allocated to the slots 600, which are created by dividing the frame 500, or a unit of time, into a plurality of sections; the data are transferred in a time-division multiplex manner. At this time, a process of transferring data to the input ports 110 and output ports 120 of the network switch 100 is performed based on the information that is set in advance as the input slot correspondence management table 132 and output slot correspondence management table 142. Therefore it is definitely possible to transfer data between the input ports 110 and the output ports 120 during a predetermined period of time. It is possible to guarantee communication bandwidths when communication takes place. Moreover, each input port 110 and output port 120 of the network switch 100 are able to set communication bandwidths separately using the input port management information 133 and the output port management information 143, respectively. Since a minimum communication bandwidth is set for a requested communication bandwidth, low-power communication is possible.

As described above, according to the present exemplary embodiment, the network switch 100 includes a plurality of input ports 110; a plurality of output ports 120; the input port control units 130, which correspond to the input ports 110; the output port control units 140, which correspond to the output ports 120; and a plurality of buffers BUF150, which act as intermediaries in transferring data from each input port 110 to each output port 120. The input ports 110 transfer data of the input slots to the buffers 150 independently on the basis of the input slot correspondence management table 132. The output ports 120 transfer data from the buffers 150 to the output slots independently on the basis of the output slot correspondence management table 142.

Thus, according to the present exemplary embodiment, in a time-division multiplex switch for carrying out communication with a guaranteed communication bandwidth, even if the communication bandwidths requested by each input/output port are not uniform due to the state of the communication, it is possible to provide an interprocessor communication system and communication method by which the switch can operate in such a way that the minimum communication bandwidths are separately guaranteed by each input/output port, and power is not consumed wastefully.

The whole or part of the exemplary embodiments disclosed above can be described as, but not limited to, the following supplementary notes.

(Supplementary note 1) An interprocessor communication system having a plurality of network switches, wherein the network switches include: a plurality of input units that input data which are to be transferred between nodes; a plurality of output units that output the data; a plurality of buffer units that act as intermediaries for data being transferred between a plurality of the input units and a plurality of the output units; an input port control unit setting unit that sets control information used to control a plurality of the input units; and an output port control unit setting unit that sets control information used to control a plurality of the output units, wherein data that are to be transferred between the nodes via a plurality of the input units, a plurality of the output units and a plurality of the buffer units are allocated to slots, which are created by dividing a unit of time into a plurality of sections, before being transferred in a time-division multiplex manner, the input units include an input port into which the data transferred by the slot is input, and an input port control unit, the input port control unit includes a selection unit that selects the buffer unit according to an input slot into which the data is input in order to transfer the data input from the input port to the buffer unit, an input slot correspondence management table that stores a correspondence relationship between the input slots and the buffer units in order to allow the selection unit to select the buffer according to the input slot, and input port management information used to control a communication bandwidth of the input port, the output units include an output port from which the data transferred by the slot is output, and an output port control unit, and the output port control unit includes a multiplexing unit that selects the buffer unit according to an output slot from which the data is output in order for the data, which is to be output to the output port, to be transferred from the selected buffer unit to the output port, an output slot correspondence management table that stores a correspondence relationship between the output slots and the buffer units in order to allow the multiplexing unit to select the buffer unit according to the output slot, and output port manage information used to control a communication bandwidth of the output port.

(Supplementary note 2) The interprocessor communication system according to supplementary note 1, wherein: the number of slots of each of a plurality of the input ports is separately set as the input port management information; the number of slots of each of a plurality of the output ports is separately set as the output port management information; and the number of slots that a plurality of the input ports have is different from the number of slots that a plurality of the output ports have.

(Supplementary note 3) The interprocessor communication system according to supplementary note 1 or 2, wherein: the input slot correspondence management table has entries whose number is equal to the number of slots of the input ports, and the identification information of output ports to which data of slots of the input ports should be transferred is stored in the entries of the input slot correspondence management table; and the output slot correspondence management table has entries whose number is equal to the number of slots of the output ports, and the identification information of input ports that should transfer data to slots of the output ports is stored in the entries of the output slot correspondence management table.

(Supplementary note 4) The interprocessor communication system according to any one of supplementary notes 1 to 3, wherein: the input units operate at an operating frequency set in the input port management information; the output units operate at an operating frequency set in the output port management information; data, which travel from the input units to the buffer units, are transferred in synchronization with the operating frequency set in the input port management information; and data, which travel from the buffer units to the output units, are transferred in synchronization with the operating frequency set in the output port management information.

(Supplementary note 5) An interprocessor communication method using a plurality of network switches, wherein the network switches transfer data, which are to be transferred between nodes via a plurality of input units, a plurality of buffer units and a plurality of output units, in a time-division multiplex manner after allocating the data to slots, which are created by dividing a unit of time into a plurality of sections; a plurality of the input units store, in an input slot correspondence management table, a correspondence relationship between the input slots and the buffer units in order to select the buffer unit according to the input slot into which the data is input, control a communication bandwidth of the input port with the use of input port management information, input the data, which is transferred by the slot, from the input port, and select the buffer unit according to the input slot into which the data is input on the basis of the input slot correspondence management table in order to transfer the data, which is input from the input port, to the buffer unit; and a plurality of the output units store, in an output slot correspondence management table, a correspondence relationship between the output slots and the buffer units in order to select the buffer unit according to the output slot from which the data is output, control a communication bandwidth of the output port with the use of output port management information, select the buffer unit according to the output slot from which the data is output on the basis of the output slot correspondence management table in order to transfer the data, which is output to the output port, from the selected buffer unit to the output port, and output the data, which is transferred by the slot, from the output port.

(Supplementary note 6) The interprocessor communication method according to supplementary note 5, wherein: the number of slots of each of a plurality of the input ports is separately set as the input port management information; the number of slots of each of a plurality of the output ports is separately set as the output port management information; and the number of slots that a plurality of the input ports have is different from the number of slots that a plurality of the output ports have.

(Supplementary note 7) The interprocessor communication method according to supplementary note 5 or 6, wherein: the input slot correspondence management table has entries whose number is equal to the number of slots of the input ports, and the identification information of output ports to which data of slots of the input ports should be transferred is stored in the entries of the input slot correspondence management table; and the output slot correspondence management table has entries whose number is equal to the number of slots of the output ports, and the identification information of input ports that should transfer data to slots of the output ports is stored in the entries of the output slot correspondence management table.

(Supplementary note 8) The interprocessor communication method according to any one of supplementary notes 5 to 7, wherein: the input units operate at an operating frequency set in the input port management information; the output units operate at an operating frequency set in the output port management information; data, which travel from the input units to the buffer units, are transferred in synchronization with the operating frequency set in the input port management information; and data, which travel from the buffer units to the output units, are transferred in synchronization with the operating frequency set in the output port management information.

(Supplementary note 9) A network switch, comprising: a plurality of input units that input data which are to be transferred between nodes; a plurality of output units that output the data; a plurality of buffer units that act as intermediaries for data being transferred between a plurality of the input units and a plurality of the output units; an input port control unit setting unit that sets control information used to control a plurality of the input units; and an output port control unit setting unit that sets control information used to control a plurality of the output units, wherein data that are to be transferred between the nodes via a plurality of the input units, a plurality of the output units and a plurality of the buffer units are allocated to slots, which are created by dividing a unit of time into a plurality of sections, before being transferred in a time-division multiplex manner, the input units include an input port into which the data transferred by the slot is input, and an input port control unit, the input port control unit includes a selection unit that selects the buffer unit according to an input slot into which the data is input in order to transfer the data input from the input port to the buffer unit, an input slot correspondence management table that stores a correspondence relationship between the input slots and the buffer units in order to allow the selection unit to select the buffer according to the input slot, and input port management information used to control a communication bandwidth of the input port, the output units include an output port from which the data transferred by the slot is output, and an output port control unit, the output port control unit includes a multiplexing unit that selects the buffer unit according to an output slot from which the data is output in order for the data, which is to be output to the output port, to be transferred from the selected buffer unit to the output port, an output slot correspondence management table that stores a correspondence relationship between the output slots and the buffer units in order to allow the multiplexing unit to select the buffer unit according to the output slot, and output port manage information used to control a communication bandwidth of the output port.

(Supplementary note 10) The network switch according to supplementary note 9, wherein: the number of slots of each of a plurality of the input ports is separately set as the input port management information; the number of slots of each of a plurality of the output ports is separately set as the output port management information; and the number of slots that a plurality of the input ports have is different from the number of slots that a plurality of the output ports have.

(Supplementary note 11) The network switch according to supplementary note 9 or 10, wherein: the input slot correspondence management table has entries whose number is equal to the number of slots of the input ports, and the identification information of output ports to which data of slots of the input ports should be transferred is stored in the entries of the input slot correspondence management table; and the output slot correspondence management table has entries whose number is equal to the number of slots of the output ports, and the identification information of input ports that should transfer data to slots of the output ports is stored in the entries of the output slot correspondence management table.

(Supplementary note 12) The network switch according to any one of supplementary notes 9 to 11, wherein: the input units operate at an operating frequency set in the input port management information; the output units operate at an operating frequency set in the output port management information; data, which travel from the input units to the buffer units, are transferred in synchronization with the operating frequency set in the input port management information; and data, which travel from the buffer units to the output units, are transferred in synchronization with the operating frequency set in the output port management information.

(Supplementary note 13) A parallel calculation system, comprising the network switch claimed in any one of supplementary notes 9 to 12.

The above has described the present invention with reference to the exemplary embodiments. However, the present invention is not limited to the above exemplary embodiments. Various modifications apparent to those skilled in the art may be made in the configuration and details of the present invention without departing from the scope of the present invention.

This application is based upon and claims the benefit of priority from Japanese patent application No. 2009-055030, filed on Mar. 9, 2009, the disclosure of which is incorporated herein in its entirety by reference.

INDUSTRIAL APPLICABILITY

The present invention can be applied for use in built-in control, for which importance is attached to real-time and low-power performance, of a multi-core system including a plurality of function nodes. The present invention can also be applied for use in an operation of optimizing each of a plurality of processes for a plurality of cores with the use of an automatic parallelization compiler and executing the processes on one parallel calculation system in such a way that the processes do not interfere with each other.

REFERENCE SIGNS LIST

100: Network switch
110: Input port
120: Output port
130: Input port control unit
131: Selection unit
132: Input slot correspondence management table
133: Input port management information
140: Output port control unit
141: Multiplexing unit
142: Output slot correspondence management table
143: Output port management information
150: Buffer
160: Input port control unit setting signal 170: Output port control unit setting signal
200: Function node
200a: Calculation node
200b: Storage node
200c: IO node
300: Process
400: Communication path
500: Frame
600: Slot
700: Slot table
1000: Parallel calculation system

The invention claimed is:

1. An interprocessor communication system having a plurality of network switches the network switches comprising:
a plurality of input units configured to input data to be transferred between nodes;
a plurality of output units configured to output data;
a plurality of buffer units configured to act as intermediaries for data being transferred between a plurality of the input units and a plurality of the output units;
an input port control unit setting unit configured to set control information used to control a plurality of the input units; and
an output port control unit setting unit configured to set control information used to control a plurality of the output units,
wherein:
the input units include an input port into which the data transferred by the slot is input, and an input port control unit; the input port control unit comprising:
a selection unit configured to select the buffer unit according to an input slot into which the data is input in order to transfer the data input from the input port to the buffer unit;
an input slot correspondence management table configured to store a correspondence relationship between the input slots and the buffer units in order to allow the selection unit to select the buffer according to the input slot; and
input port management information used to control a communication bandwidth of the input port in such a way that the communication bandwidth of the input port becomes equal to, or more than a sum of, requested communication bandwidths, which each of one or more communication paths through the input port requests, and becomes a first integral multiple of the minimum communication bandwidth;
the output units include an output port from which the data transferred by the slot is output, and an output port control unit; the output port control unit comprising:
a multiplexing unit configured to select the buffer unit according to an output slot from which the data is output in order for the data, which is to be output to the output port, to be transferred from the selected buffer unit to the output port;
an output slot correspondence management table configured to store a correspondence relationship between the output slots and the buffer units in order to allow the multiplexing unit to select the buffer unit according to the output slot; and
output port management information used to control a communication bandwidth of the output port in such a way that the communication bandwidth of the output port becomes equal to, or more than a sum of, requested communication bandwidths, which each of one or more communication paths through the output port requests, and becomes a second integral multiple of the minimum communication bandwidth;
data, to be transferred between the nodes via a plurality of the input units, a plurality of the output units and a plurality of the buffer units, is allocated to slots, which are created by dividing a unit of time into a plurality of sections, before being transferred in a time-division multiplex manner;
said control of the communication bandwidth of the input port and said control of the communication bandwidth of the output port are performed separately;
the number of slots of each of a plurality of the input ports is separately set as the input port management information;
the number of slots of each of a plurality of the output ports is separately set as the output port management information;
the number of slots of each of a plurality of the input ports is proportional to said first integral number; and
the number of slots of each of a plurality of the input ports is proportional to said second integral number.

2. The interprocessor communication system according to claim 1, wherein the number of slots that a plurality of the input ports have is different from the number of slots that a plurality of the output ports have.

3. The interprocessor communication system according to claim 1 wherein:
the input slot correspondence management table has entries whose number is equal to the number of slots of the input ports, and the identification information of output ports to which data of slots of the input ports should be transferred is stored in the entries of the input slot correspondence management table; and
the output slot correspondence management table has entries whose number is equal to the number of slots of the output ports, and the identification information of input ports that should transfer data to slots of the output ports is stored in the entries of the output slot correspondence management table.

4. The interprocessor communication system according to claim 1, wherein:
the input units operate at an operating frequency set in the input port management information;
the output units operate at an operating frequency set in the output port management information;
data, which travels from the input units to the buffer units, are transferred in synchronization with the operating frequency set in the input port management information; and
data, which travels from the buffer units to the output units, are transferred in synchronization with the operating frequency set in the output port management information.

5. A network switch, comprising:
a plurality of input units configured to input data to be transferred between nodes;
a plurality of output units configured to output data;
a plurality of buffer units configured to act as intermediaries for data being transferred between a plurality of the input units and a plurality of the output units;
an input port control unit setting unit configured to set control information used to control a plurality of the input units; and
an output port control unit setting unit configured to set control information used to control a plurality of the output units, wherein:

the input units include an input port into which the data transferred by the slot is input, and an input port control unit; the input port control unit comprising:
- a selection unit configured to select the buffer unit according to an input slot into which the data is input in order to transfer the data input from the input port to the buffer unit;
- an input slot correspondence management table configured to store a correspondence relationship between the input slots and the buffer units in order to allow the selection unit to select the buffer according to the input slot; and
- input port management information used to control a communication bandwidth of the input port in such a way that the communication bandwidth of the input port becomes equal to, or more than a sum of, requested communication bandwidths, which each of one or more communication paths through the input port requests, and becomes a first integral multiple of the minimum communication bandwidth;

the output units include an output port from which the data transferred by the slot is output, and an output port control unit; the output port control unit comprising:
- a multiplexing unit configured to select the buffer unit according to an output slot from which the data is output in order for the data, which is to be output to the output port, to be transferred from the selected buffer unit to the output port;
- an output slot correspondence management table configured to store a correspondence relationship between the output slots and the buffer units in order to allow the multiplexing unit to select the buffer unit according to the output slot; and
- output port management information used to control a communication bandwidth of the output port in such a way that the communication bandwidth of the output port becomes equal to, or more than a sum of, requested communication bandwidths, which each of one or more communication paths through the output port requests and becomes a second integral multiple of the minimum communication bandwidth;

data, to be transferred between the nodes via a plurality of the input units, a plurality of the output units and a plurality of the buffer units, is allocated to slots, which are created by dividing a unit of time into a plurality of sections, before being transferred in a time-division multiplex manner;

said control of the communication bandwidth of the input port and said control of the communication bandwidth of the output port are performed separately;

the number of slots of each of a plurality of the input ports is separately set as the input port management information;

the number of slots of each of a plurality of the output ports is separately set as the output port management information;

the number of slots of each of a plurality of the input ports is proportional to said first integral number; and the number of slots of each of a plurality of the input ports is proportional to said second integral number.

6. The network switch according to claim 5, wherein the number of slots that a plurality of the input ports have is different from the number of slots that a plurality of the output ports have.

7. The network switch according to claim 5, wherein:
- the input slot correspondence management table has entries whose number is equal to the number of slots of the input ports, and the identification information of output ports to which data of slots of the input ports should be transferred is stored in the entries of the input slot correspondence management table; and
- the output slot correspondence management table has entries whose number is equal to the number of slots of the output ports, and the identification information of input ports that should transfer data to slots of the output ports is stored in the entries of the output slot correspondence management table.

8. The network switch according to claim 5, wherein:

the input units operate at an operating frequency set in the input port management information;

the output units operate at an operating frequency set in the output port management information;

data, which travels from the input units to the buffer units, are transferred in synchronization with the operating frequency set in the input port management information; and data, which travels from the buffer units to the output units, are transferred in synchronization with the operating frequency set in the output port management information.

9. A parallel calculation system, comprising the network switch claimed in claim 5.

* * * * *